United States Patent [19]
Jackson

[11] 3,875,650
[45] Apr. 8, 1975

[54] METHOD OF MAKING A TRUSSED JOIST STRUCTURE

[75] Inventor: Edgar D. Jackson, Alta Loma, Calif.

[73] Assignee: Steel Web Corporation, Alta Loma, Calif.

[22] Filed: Feb. 15, 1974

[21] Appl. No.: 442,916

Related U.S. Application Data

[60] Division of Ser. No. 338,207, March 5, 1973, which is a continuation-in-part of Ser. No. 169,998, Aug. 9, 1971, Pat. No. 3,748,809.

[52] U.S. Cl. ............... 29/432; 29/526; 52/644; 52/693
[51] Int. Cl. ............................. B23p 11/00
[58] Field of Search ............ 29/432, 526, 155 R; 52/644, 693, 730

[56] References Cited
UNITED STATES PATENTS

| | | | |
|---|---|---|---|
| 2,151,959 | 3/1939 | Edison | 52/644 |
| 2,159,589 | 5/1939 | Edison | 52/644 |
| 3,413,703 | 12/1968 | Sanford | 29/155 R |
| 3,416,283 | 12/1968 | Sanford | 52/693 |
| 3,435,508 | 4/1969 | Sanford | 29/432 |
| 3,496,693 | 2/1970 | Troutner | 29/432 X |
| 3,503,173 | 3/1970 | Jureit | 52/644 |
| 3,531,904 | 10/1970 | Sanford | 52/693 X |
| 3,570,204 | 3/1971 | Berkemier | 52/693 X |
| 3,605,360 | 9/1971 | Lindal | 52/730 X |
| 3,778,946 | 12/1973 | Wood et al. | 29/155 X |

*Primary Examiner*—Charlie T. Moon
*Attorney, Agent, or Firm*—William W. Haefliger

[57] ABSTRACT

A mobile home roof frame structure capable of rapid fabrication comprises upper and lower wooden chord members, multiple wooden blocks extending between the members, metallic reinforcement including diagonal straps, and nail type fasteners driven into the chord members and through concealed terminals of the straps. Metallic reinforcement strip or strips may extend between sections of the chord members and lengthwise thereof, to be fastened in position by the nail type fasteners. Additional metal straps and interfitting of the blocks and chord members are provided.

1 Claim, 13 Drawing Figures

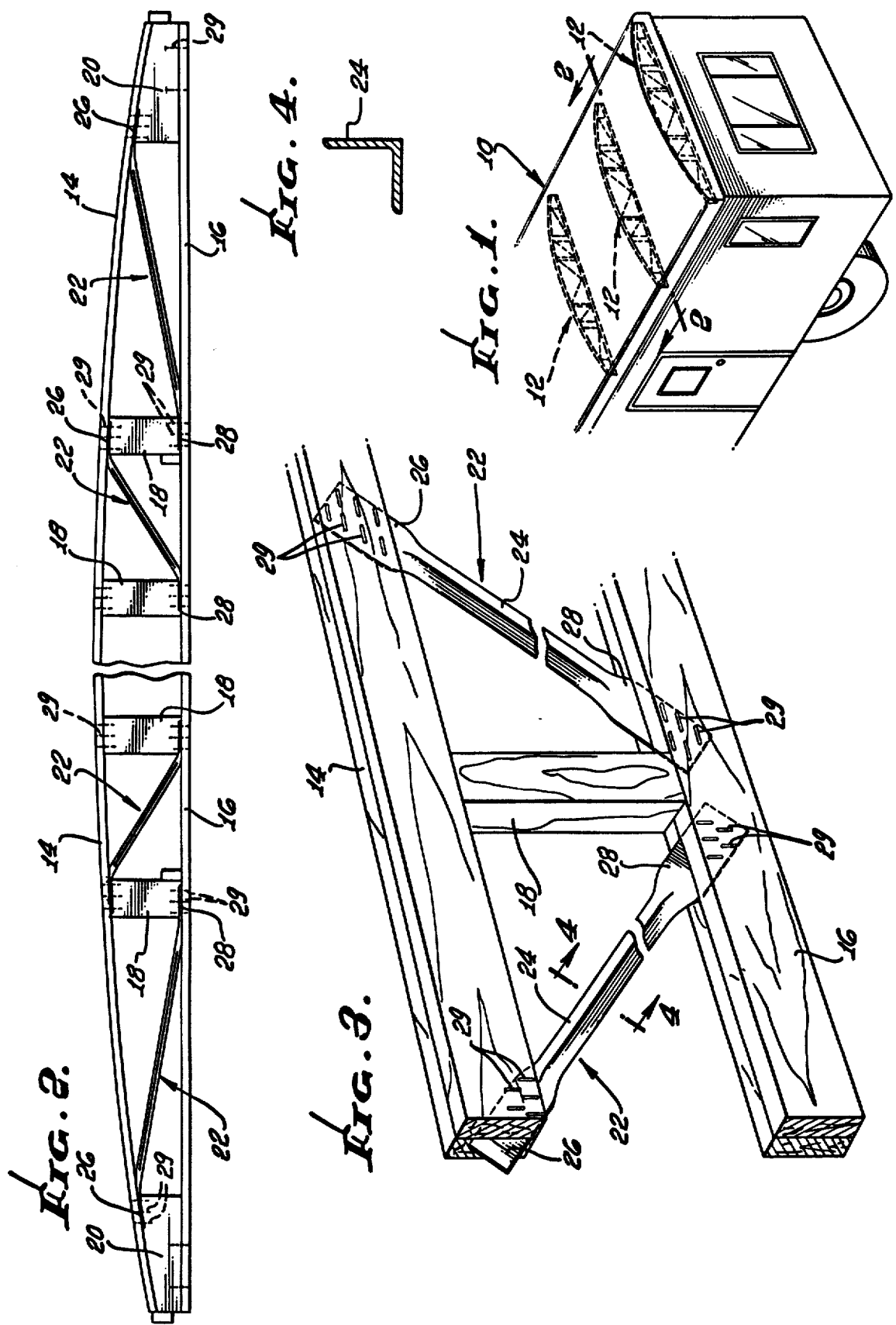

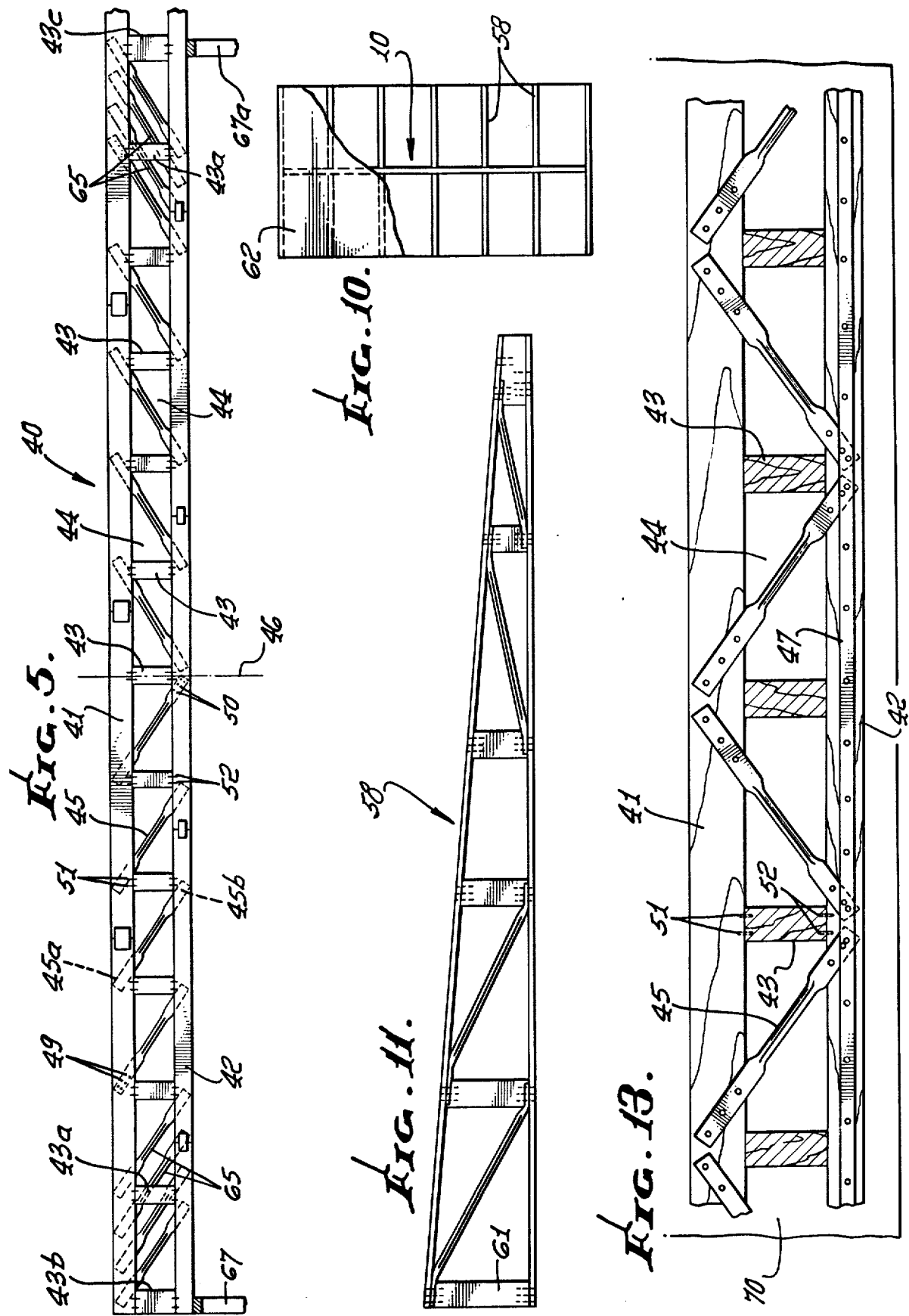

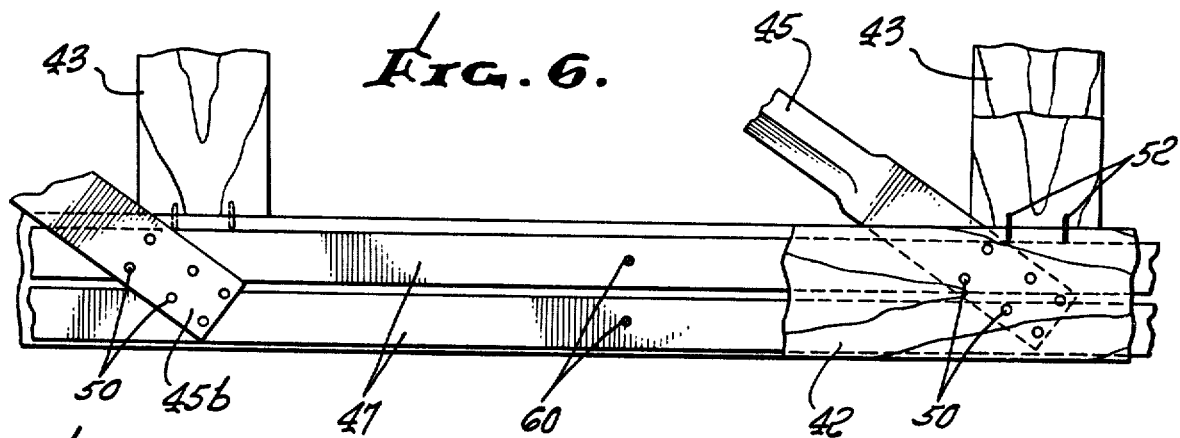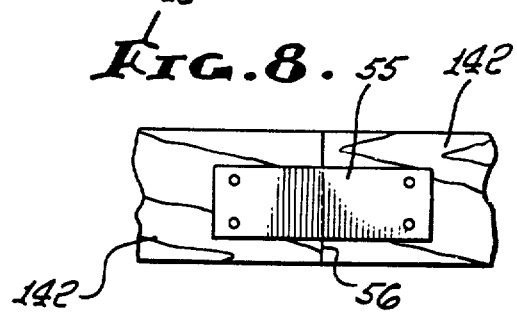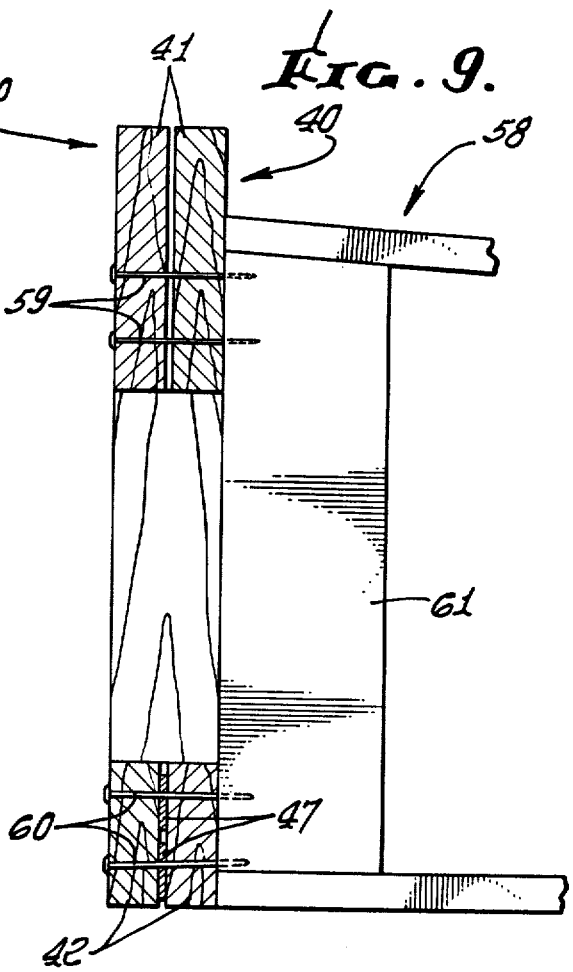

3,875,650

METHOD OF MAKING A TRUSSED JOIST STRUCTURE

This is a division of application Ser. No. 338,207 filed Mar. 5, 1973, which is a continuation-in-part of my prior application Ser. No. 169,998, filed Aug. 9, 1971, now U.S. Pat. No. 3,748,809.

BACKGROUND OF THE INVENTION

This invention relates generally to the construction of wooden beams or trusses, and more particularly concerns the special construction of same adapting them for use in mobile homes.

Prior to this invention difficulty was experienced in providing adequate support for mobile home roofs, which was of sufficient strength yet light in weight, durable, easy to use and not unreasonably expensive. The existing conventional structures used for this purpose often were secured by glue and with gussets which tended to fail under stress and age. When such structures were made heavy enough to be durable, even further stress and consequent breakdowns of the structure were likely to occur. On the other hand, conventional lightweight roof supporting structures did not have sufficient rigidity and strength to be adequate for the heavy loads of large mobile homes.

SUMMARY OF THE INVENTION

It is a major object of the invention to provide a truss or roof beam constructed so as to be rapidly and easily fabricated and which is specially adapted to mobile home use, overcoming the above as well as other problems and difficulties encountered in this field.

Basically, the invention is embodied in a roof beam defining frame structure that comprises longitudinally elongated, wooden, upper and lower chord members, which may comprise separate but adjacent sections; multiple upright wooden blocks which are longitudinally spaced apart and which extend between the upper and lower chord members to transmit loading therebetween when the frame structure is loaded; metallic reinforcement means attached to the chord members and including metallic straps interconnecting the upper and lower chord members and extending generally diagonally relative to the blocks in the spaces therebetween; and nail type fasteners attaching the reinforcement means to the chord members, in the simple yet effective manner to be described. As will be seen, each of the upper and lower chord members may comprise multiple parallel and adjacent sections, the metal straps may have flat terminals received between the sections, the reinforcement means may include an elongated metallic strip extending lengthwise of and adjacent at least one of the lower chord member sections, and preferably between such sections; certain of the nail type fasteners may be driven to extend into the upper chord member sections and through the strap upper terminals to interconnect same, and others of the nail type fasteners may be driven to extend into the lower chord member sections and through the strap lower terminals as well as through the reinforcing strip to interconnect same. Further, this construction enables employment of a very rapid fabrication process, as will appear.

Additional important objects include the provision of one or more additional metallic straps sidewardly overlapping one or more wooden block members near an end or opposite ends of the frame structure; the provision of wooden block members with special end notching to receive the wooden chord members; and the construction of a roof truss or beam assembly employing individual beams as defined.

These and other objects and advantages of the invention, as well as the details of specific embodiments, will be more fully understood from the following description and drawings, in which:

DRAWING DESCRIPTION

FIG. 1 is a partial view, in perspective, of a mobile home utilizing trussed joist structure shown in ghost views in accordance with this invention;

FIG. 2 is an elevational view of a trussed joist taken through the vertical plane of support 2—2 in FIG. 1 showing upper and lower chord members interconnected by short vertical compression web members and diagonal tension web members;

FIG. 3 is a fragmented perspective enlarged detail view of the diagonal tension web members interconnected to the upper and lower chords;

FIG. 4 is a cross-sectional view taken through 4—4 of FIG. 3 showing the angle formed section of the central body portion of a diagonal tension web member;

FIG. 5 is an elevational view of another form of beam embodying the invention;

FIG. 6 is an enlarged fragmentary elevation, partly broken away, showing a portion of the FIG. 5 beam construction;

FIG. 7 is an enlarged fragmentary elevation showing a spliced connection usable in the FIG. 5 beam;

FIG. 8 is an enlarged framentary elevation showing another spliced connection usable in the FIG. 5 beam;

FIG. 9 is an enlarged vertical section through the FIG. 5 beam, and showing the manner of its connection to a rafter.

FIG. 10 is a plan view of a ridge beam and rafter assembly as usable on a mobile home;

FIG. 11 is an elevational view of a rafter as usable in FIGS. 9 and 10;

FIG. 12 is a view like FIG. 9, but showing a modification; and

FIG. 13 is a plan view showing of a method of fabricating the FIG. 5 beam.

DETAILED DESCRIPTION

Referring to FIG. 1 the drawings, trussed joists 10 are provided for support of a mobile home roof 12. Each of these joists 10 has a frame which includes an elongated upper chord member 14 and a matching, elongated lower chord member 16 spaced vertically below it. The joists 10 are interconnected parallel to each other and spaced sufficiently apart to provide the required roof support.

As seen in FIG. 2, a plurality of horizontally spaced, short, vertical wooden blocks or web members 18 interconnect the upper chord member 14 and the lower chord member 16. Toward the end of a joist 10 the chord members 14 and 16 approach closer to each other, so that they are interconnected by a vertical end web member 20 which, as shown, takes the form of a short block shaped to conform to the adjacent abutting portions of the chord members.

In between at least some of the vertical web members 18 are diagonally mounted angled web members 22 which extend in a generally vertical plane interconnecting the upper chord member 14 and the lower chord member 16. These angled web members 22 may advantageously be formed with an angled central body portion 24 terminating at a flat upper end 26 intended to be secured to the upper chord member 14 and a flat lower end 28 intended to be secured to the lower chord member 16. Ordinarily, the angled web members 22 are made of steel strap which permits maximum strength with minimum weight. The legs which join to form the angled central body portion 24 extend approximately equally from their common juncture to their terminal edges.

In use, in the form shown in FIG. 3, the modified angled web members 22 are diagonally mounted between two vertical web members 18 (or end web member 20 when adjacent to an end) of a joist 10 by sliding or locating the flat upper end 26 in between two separate wooden elements or sections of the upper chord member 14 adjacent to one vertical web member 18. Similarly, the web or strap flat lower end 28 is located in between two separate wooden elements or sections of the lower chord member 16 adjacent to another vertical web member 18. The flat ends 26 and 28 are secured in place by suitable means. In the form shown in FIG. 2, the flat ends 26 and 28 are mounted between the respective upper and lower chord members 14 and 16, and the adjacent respective vertical web member 18 or end member 20.

Thus, as so mounted, the angled web member 22 extends diagonally between upper chord member 14 and lower chord member 16 with the opposite ends 26 and 28 each adjacent to a vertical web member 18. A particularly strong, rigid, truss support for the joist 10 is provided by this structure since load bearing pressure on the chord member 14 and 16 causes tensioning of the angled web member 22. Such tension induced load is effectively carried by the angled web member 22 under compression of the vertical member 18, since the normal load bearing pressure is through the vertical plane of the upper and lower chord members 14 and 16, and the fastening of the ends 26 and 28 is effected by staple or nail fasteners passing into or through the connected chords as in FIG. 3, or chord and vertical members 18 as in FIG. 2. This structural arrangement permits the maximum strength of the angled web member 22 to squarely meet the vertical load bearing force thereby allowing the weight and number of bracing supports for the joist 10 to be reduced to the minimum.

It is of substantial importance to the performance or functioning of this invention that the staple or nail fasteners 29, when used, extend into or through the connected wood members and ends 26 and 28, with sufficient penetration to not only hold the members in position under the tension stress of a load, but also bind the members and end of the fastener ruptured angle web member by friction pressure. In this regard the fasteners are driven blindly through the confined metallic end terminals 26 and 28.

As an example, the described truss joist structure may use chord members 14 and 16 which are one by two inch boards of sufficient length to provide the lateral span for support of a mobile home roof. The vertical web members 18 are one by two inch boards cut just long enough to extend between that portion of the upper and lower chords 14 and 16 where they are required to be placed in combination with the diagonally mounted angled web members 22 for the particular load which is to be supported. Since the distance between the upper and lower chords 14 and 16 varies, in FIG. 2, depending on the distance from their end connection, the length of the vertical web member will accordingly vary.

The longitudinal spacing of successive vertical web members 18 also varies in accordance with the load to be supported, and for minimum suitable support typically ranges from twenty to forty inches. An angled web member 22 which has been found suitable for use in this invention is made of one to two inch width steel angle strap which has an angled central body portion 24 of a length that substantially extends the full distance between the ends 26 and 28. The length of each of the angled web members 22 varies according to the spacing of the upper and lower chords 14 and 16 and the vertical chords 18 adjacent to which the opposite ends 26 and 28 are mounted. These flat ends 26 and 28 are secured to chords 14 and 16 by fasteners such as one and one-half inch long staples.

Other forms of the diagonal load bearing member 22 which has ends 26 and 28 interconnected by staple-type fasteners 29, as previously discussed, may have body portion 24 which are tubular or corrugated, for instance, so long as they have similar rigidity to the angled body form described herein.

Referring next to FIGS. 5-9, a modified frame structure 40 defines a beam as may for example be used as a ridge beam on a mobile home. It includes longitudinally elongated wooden upper chord member sections, as for example are shown at 41, and longitudinally elongated wooden lower chord member sections, as for example appear at 42. Like sections 41 have substantially greater vertical dimension than like sections 42.

Multiple, upright wooden webs or blocks are provided, as at 43, with longitudinal spacing at 44, the blocks extending between the upper and lower chord member sections to transmit compressive loading therebetween when the frame is loaded. In addition, metallic reinforcement means is attached to the sections, and includes flat metallic straps or webs 45 which interconnect the upper and lower chord member sections. The straps, which may consist of steel, extend generally diagonally relative to the blocks in spaces 44; further, the straps have upper flat terminals 45a received between the upper chord member sections, and lower flat terminals 45b received between the lower chord member sections, as shown. Note that the straps at the left side of the beam center line 46 extend diagonally upwardly to the left, and the straps at the right side of center line 46 extend diagonally upwardly to the right.

The metallic reinforcement means may also include at least one longitudinally elongated, flat metallic strip extending lengthwise of and adjacent at least one of the lower chord member sections in reinforcing relation therewith. Two such strips 47 are shown, located between the two lower chord member sections 42, as best seen in FIGS. 6 and 9, the two strips being vertically spaced to extend in the same plane. These strips extend continuously between opposite ends of the beam, with no splicing of the strips, the flat terminals 45b of the straps overlapping the strips as seen in FIG. 6.

Attachment of the metallic reinforcement means to the upper and lower chord members is accomplished by means of nail type fasteners certain of which, as at 49, are driven blindly and extend into the upper chord member sections 41 and through the strap upper flat terminals 45a, and others of which, as at 50, are driven blindly and extend into the lower chord member sections 42 and through the strap lower flat terminals and the elongated reinforcement strips 47 to interconnect same. Similar fasteners, of U-shape, may be driven into the upper chord member sections and the wooden blocks as at 51, and into the lower chord member sections and the wooden blocks, as at 52, to interconnect the blocks and sections. Finally, in the event the chord member sections are constituted of end-to-end subsections, they may be spliced together. See in this regard the splice plate 53 overlapping the joint 54 between upper chord member sub-sections 141 in FIG. 7, and the splice plate 55 overlapping the joint 56 between the lower chord member sub-section 142 in FIG. 8, appropriate nails being shown as driven through the plates and into adjacent end-to-end chord member subsections.

FIGS. 9 and 10 show additional like beams 58 projecting as rafters and laterally from the longitudinally ridge beam or girder 10, such beams 58 having ends connected to beam 10 at longitudinally spaced intervals. Such connections may be accomplished by nails 59 and 60 driven through the upper and lower chord member sections, and through reinforcement strips 47 as shown in FIG. 9, into the rafter end blocks 61, whereby a rapid fabrication of the rafters and ridge beam can be accomplished to structionally support the recreational vehicle roof 62 and strengthen the body of the vehicle. FIG. 11 shows a typical rafter with a tapered construction as generally referred to in FIG. 1.

Referring back to FIG. 5, an additional aspect of the invention concerns the provision of at least one diagonal flat metallic strap overlapping a wooden block member near a supported portion of the frame structure. Two such added straps 65 are employed in FIG. 5 at each end of the beam 10, and typically extend at the outer sides of the wooden blocks 43a next to the block or blocks 43b and 43c at supported portions of the frame structure. See for example the supports 67 and 67a. Such straps 65 are provided where the tension loads on straps 45 are the greatest. Straps 65 have upper and lower end terminals respectively attached to the upper and lower chord members as by additional nail type fasteners, as previously described.

FIG. 12 illustrates the provision of modified wooden blocks 68 the opposite end portions of which are notched as at 68a and 68b to receive the upper and lower chord members, respectively. This enables nailing through the chord members and into the block end extensions 68c and 68d, as illustrated by nails 69, to provide additional strength for maintenance of the upper and lower chord members in vertical alignment.

Finally, FIG. 13 illustrates a process for very rapidly constructing a beam as shown in FIG. 5. One of the upper and one of the lower chord member sections 41 and 42, as shown, are first supported on a work top 70 to extend in generally parallel, spaced apart relation; wooden blocks 43 are also located as shown, extending endwise normal to the sections; straps 45 are positioned as shown; the metallic strips 47 are located to extend adjacent the lower section 42 and over the strap terminals; and finally the other upper and lower sections are laid in position over their corresponding sections and nailed in position, certain nails passing blindly through the strips 47 and the strap terminals. The wooden blocks are also nailed at 51 and 52 to the other upper and lower sections. Added straps 65 may be nailed in place at the outer side of the beam, and the beam may then be compression rolled for alignment and assurance that all nails are in driven-in position.

I claim:

1. The method of constructing a beam that includes a pair of upper chord member sections, a pair of lower chord member sections, multiple wooden blocks, multiple metallic straps, and an elongated reinforcing metallic strip, that includes
   a. supporting one of the upper and one of the lower chord member sections to extend in generally parallel, spaced apart relation with the wooden blocks extending endwise between and normal to the sections and in longitudinally spaced apart relation,
   b. locating the straps to extend generally diagonally relative to the blocks in the spaces therebetween and nailing strap opposite end terminals respectively to the supported upper and lower sections,
   c. locating the metallic strip adjacent a selected supported chord section to extend adjacent the strap terminals at said selected section and nailing the strip to said selected section, and
   d. locating the other of the upper and the other of the lower chord member sections respectively to overlie said one of the upper and one of the lower chord member sections, and nailing said overlying sections together with the strap terminals and the reinforcing strip concealed between nailed together sections.

* * * * *